United States Patent
Sowa et al.

(10) Patent No.: US 10,114,615 B1
(45) Date of Patent: Oct. 30, 2018

(54) FEATURE BASED CONTROL SYSTEM FOR MULTI-USER CAX

(71) Applicant: United Technologies Corporation, Hartford, CT (US)

(72) Inventors: William A. Sowa, Simsbury, CT (US); Andrew D. Milliken, Middletown, CT (US); Joshua Daniel Winn, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 317 days.

(21) Appl. No.: 14/969,628

(22) Filed: Dec. 15, 2015

Related U.S. Application Data

(60) Provisional application No. 62/092,478, filed on Dec. 16, 2014.

(51) Int. Cl.
*G06F 9/44* (2018.01)
*G06F 17/30* (2006.01)
*G06F 8/20* (2018.01)

(52) U.S. Cl.
CPC .......... *G06F 8/20* (2013.01); *G06F 17/30584* (2013.01)

(58) Field of Classification Search
CPC .................. G06F 8/20; G06F 17/30584
See application file for complete search history.

(56) References Cited

U.S. PATENT DOCUMENTS

| | | | |
|---|---|---|---|
| 8,229,715 B1 | 7/2012 | Teller et al. | |
| 8,566,066 B2 | 10/2013 | Thompson et al. | |
| 8,856,131 B1* | 10/2014 | Liu | G06Q 30/02 707/737 |
| 2005/0193035 A1* | 9/2005 | Byrne | G06F 11/1471 |
| 2006/0195417 A1* | 8/2006 | Acharya | G06F 17/30943 |
| 2007/0067349 A1* | 3/2007 | Jhaveri | G06F 17/30206 |
| 2008/0005475 A1* | 1/2008 | Lubbers | G06F 3/0613 711/118 |
| 2012/0317497 A1* | 12/2012 | Red | G06F 17/50 715/751 |
| 2013/0144566 A1 | 6/2013 | De Biswas | |
| 2014/0222387 A1 | 8/2014 | Cannon et al. | |

(Continued)

OTHER PUBLICATIONS

Xu, Y., A flexible context architecture for a multi-user GUI, Department of Mechanical Engineering, Brigham Young University, Dec. 2010.

(Continued)

*Primary Examiner* — Viva Miller
(74) *Attorney, Agent, or Firm* — Carlson, Gaskey & Olds, P.C.

(57) ABSTRACT

A system for collaborating on a component according to an exemplary aspect of the present disclosure includes, among other things, a data module configured to access data corresponding to a component design, the component design corresponding to a group of feature types. A comparison module is configured to cause the data module to store data corresponding to the component design in a first data container when at least one predetermined criterion is met, and configured to cause the data module to store the data in a second data container when the at least one predetermined criterion is not met. A method for collaborating on a component is also disclosed.

18 Claims, 3 Drawing Sheets

(56) References Cited

U.S. PATENT DOCUMENTS

| | | | |
|---|---|---|---|
| 2014/0222919 A1 | 8/2014 | Nysetvold et al. | |
| 2015/0097663 A1* | 4/2015 | Sloo | G01N 27/02 |
| | | | 340/501 |

OTHER PUBLICATIONS

Red, E., French, D., Hepworth, A., Jensen, G., Stone, B., Multi-user computer-aided design and engineering software applications, Cloud-Based Design and Manufacturing (CBDM), Springer International Publishing, Jan. 1, 2014.

Red, E., Jensen, G., Ryskamp, J., Mix, K., NxConnect: multi-user CAx on a commercial engineering software application, Department of Mechanical Engineering, Brigham Young University, 2010.

* cited by examiner

FEATURE BASED CONTROL SYSTEM FOR MULTI-USER CAX

CROSS-REFERENCE TO RELATED APPLICATION

The present disclosure claims priority to U.S. Provisional Patent Application No. 62/092,478, filed Dec. 16, 2014.

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a data module configured to access at least one database corresponding to a component design. The component design corresponds to a group of feature types. A comparison module is configured to cause the data module to store data corresponding to the component design in a first data container when at least one predetermined criterion is met, and configured to cause the data module to store the data in a second data container when the at least one predetermined criterion is not met.

In a further embodiment of any of the foregoing embodiments, the data characterizes at least one feature. At least one feature is selected from the group of feature types.

In a further embodiment of any of the foregoing embodiments, the predetermined criterion is at least partially based on at least one of the group of feature types. A part identifier and an assembly identifier each correspond to the component design.

In a further embodiment of any of the foregoing embodiments, a first access condition is set for the first data container. A second, different access condition is set for the second data container. The at least one predetermined criterion is at least partially based on at least one of the first and second access conditions.

In a further embodiment of any of the foregoing embodiments, the first and second access conditions relate to at least one access list.

In a further embodiment of any of the foregoing embodiments, the first data container is configured to store a first part file. The second data container is configured to store a second part file. The at least one database is configured to link the component design to the first and second part files.

In a further embodiment of any of the foregoing embodiments, the at least one database is configured to store metadata corresponding to the component design, and the first and second data containers are configured to store binary data characterizing the component design.

In a further embodiment of any of the foregoing embodiments, the first data container is located at a first data storage device and the second data container is located at a second data storage device.

A further embodiment of any of the foregoing embodiments includes a synchronization module configured to link the first data container and the second data container to the at least one database.

In a further embodiment of any of the foregoing embodiments, the synchronization module is configured to communicate data corresponding to the component design from one of the first data container and the second data container based on the at least one predetermined criterion and in response to querying the at least one database.

A system for collaborating on a component according to an example of the present disclosure includes a data module configured to access data corresponding to a component design. The component design corresponds to a group of feature types. A comparison module is configured to cause the data module to store data corresponding to the component design at a first database partition when at least one predetermined criterion is met, and configured to cause the data module to store the data at a second database partition when the at least one predetermined criterion is not met. The comparison module is configured to be executed by a computing platform. The computing platform includes a processor and a memory storage device.

In a further embodiment of any of the foregoing embodiments, the first database partition is linked to a first part file, and the second database partition is linked to a second part file.

In a further embodiment of any of the foregoing embodiments, the first database partition is a first database linked to a parent database, the second database partition is a second database linked to the parent database, and the data module is configured to access the parent database to store the data corresponding to the component design.

In a further embodiment of any of the foregoing embodiments, the at least one predetermined criterion is based on at least one access list.

In a further embodiment of any of the foregoing embodiments, the first and second database partitions are accessible according to the at least one access list.

A method for collaborating on a component according to an example of the present disclosure includes the steps of accessing at least one database corresponding to a component design, the component design corresponding to a group of feature types, causing data corresponding to at least one feature of the component design to be stored to a first data container when at least one predetermined criterion is met, and causing the data to be stored to a second data container when the at least one predetermined criterion is not met. At least one feature corresponds to the group of feature types.

In a further embodiment of any of the foregoing embodiments, the at least one predetermined criterion and the first and second data containers correspond to at least one access list.

A further embodiment of any of the foregoing embodiments further includes displaying the data corresponding to the component design from the first data container in an environment when at least one predetermined criterion is met, but displaying the data corresponding to the component design from the second data container in the environment when the at least one predetermined criterion is not met. The environment and the at least one predetermined criterion corresponding to the at least one access list.

In a further embodiment of any of the foregoing embodiments, the step of displaying is performed in response to modification of the component design by a second user profile characterized by the at least one access list.

A further embodiment of any of the foregoing embodiments includes linking a field in the at least one database to a first part file at the first data container when the at least one predetermined criterion is met, but linking the field to a second part file at the second data container when the at least one predetermined criterion is not met. The field corresponds to the component design.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
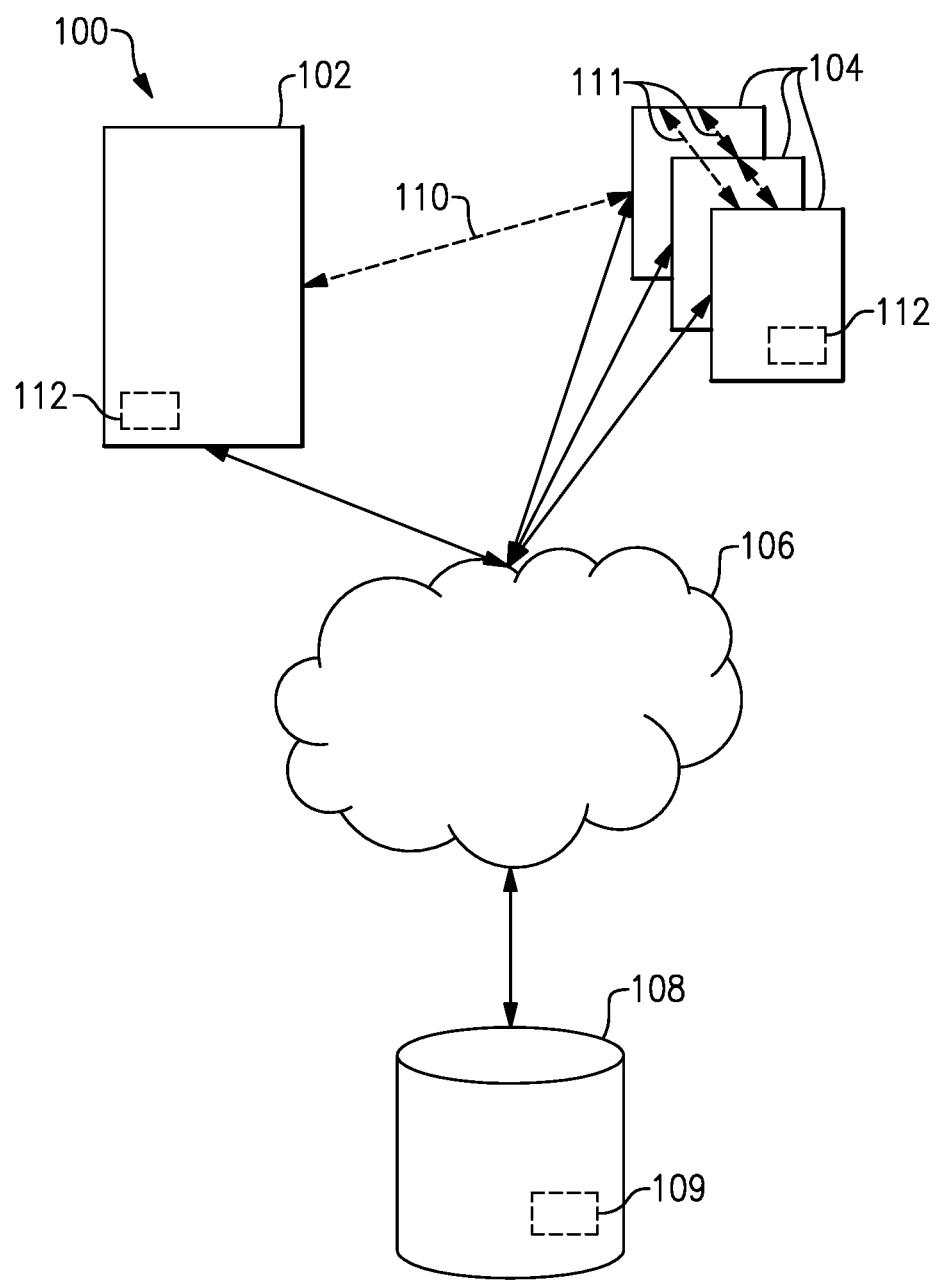
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

In some situations, the multiple users who use a CAx environment 112 are assigned with different level(s) of access to a component design via a user profile. For example, the component design, or various aspects of the component design including the feature(s) or feature type(s), can be associated with one or more of the level(s) of access or permissions. In some embodiments, different levels of access are designated for users that are restricted from accessing various aspects of a component design due to export controls, security classification or proprietary restrictions, for example. Other restricted and unrestricted levels of access are contemplated in this disclosure, including job disciplines and organization structures, for example. Accordingly, it may be desirable to limit access to aspects of a component design depending on the level(s) of access provided to a particular user profile. In some embodiments, each user profile corresponds to one or more access lists setting the level(s) of access for each user profile. Although two levels of access are primarily discussed in this disclosure for illustrative purposes, it should be appreciated that any number of access levels or permissions are contemplated depending on the needs of a particular situation.

Figure 2A:
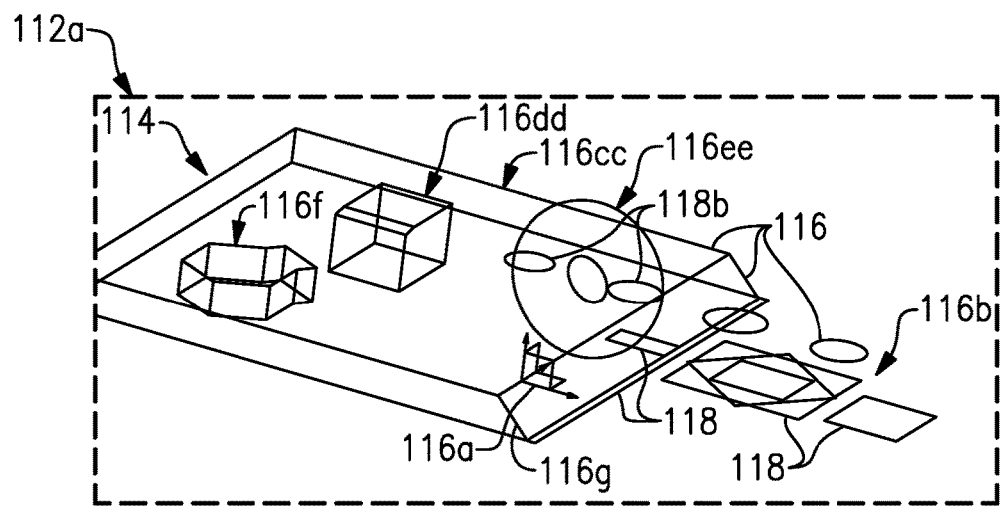
FIG. 2A illustrates a sample component design displayed in a first CAx environment, according to an embodiment.
Figure 2B:
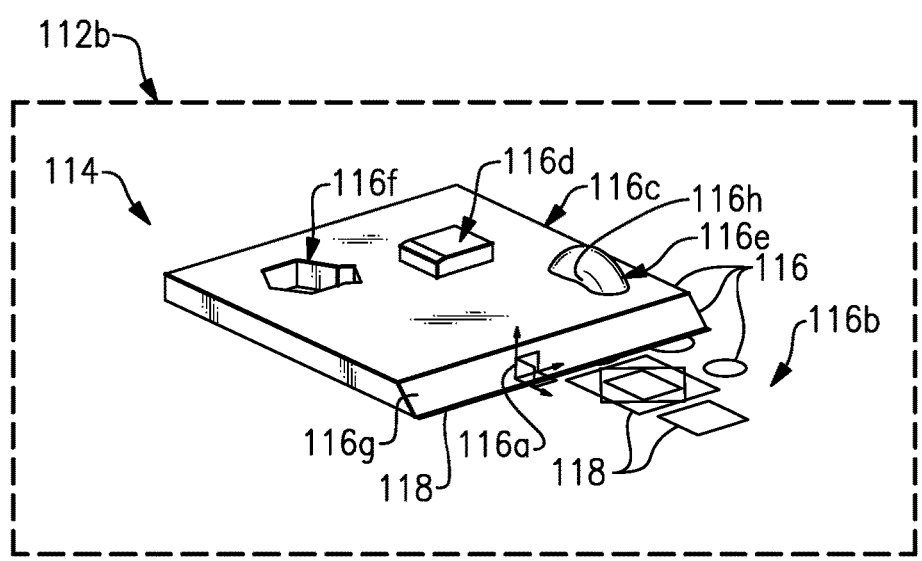
FIG. 2B illustrates the sample component design of FIG. 2A displayed in a second CAx environment, according to an embodiment.

FIGS. 2A-2B illustrate an embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type, according to some embodiments. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum provided by a CAx environment 112 based on a particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b, according to an embodiment. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114. Although each user provided with a CAx environment 112 is able to select one or more visualization settings, it may be desirable to limit the ability of a user to access, view and/or edit various aspects of a component design 114, including the ability to query or access a particular memory location, for example.

Figure 3:
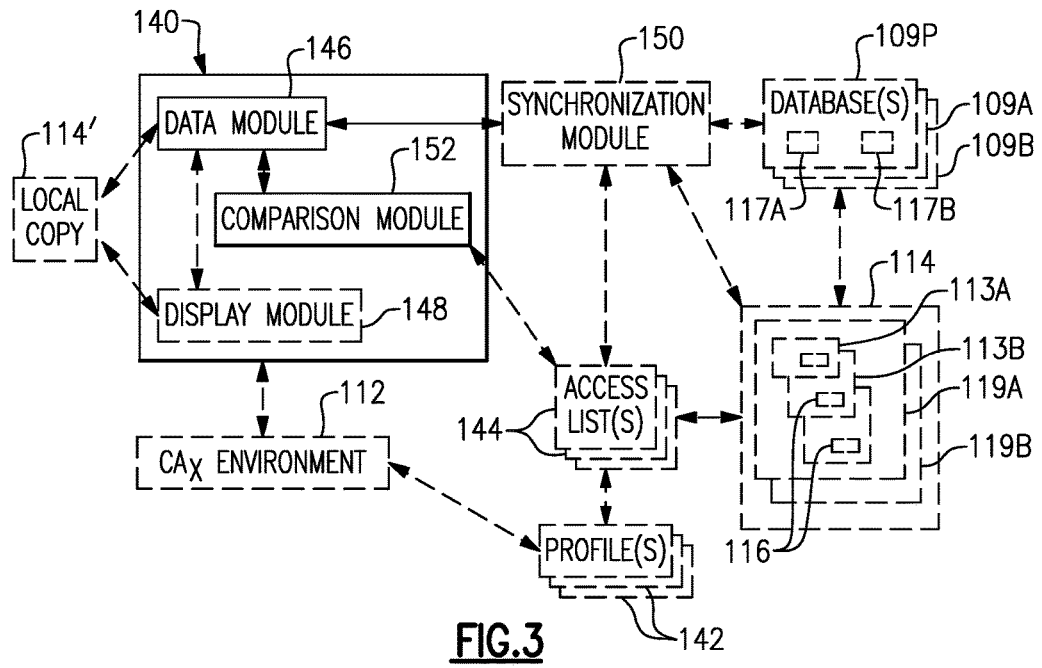
FIG. 3 illustrates a system for storing data corresponding to a component design, according to an embodiment.

FIG. 3 illustrates a CAx package 140 for collaborating on a component design 114 with another CAx environment, such as one of the CAx environments 112a, 112b, according to an embodiment. The CAx package 140 is configured to store data corresponding to a component design 114 based on certain access permissions or other criteria associated with the data. In some embodiments, the data corresponds to at least one feature 116 and/or feature type corresponding to the component design 114. In other embodiments, the data corresponds to one or more part files 113 corresponding to the component design 114.

The CAx package 140 is configured to store the data to a particular location based on at least one predetermined criterion, which are discussed in detail below. The location can include a unique network address or handle, a database, database record or entry, database segment or partition, or a physical memory location or device, for example. This technique permits a user provided with a CAx environment 112 to protect data corresponding to various aspects of a component design 114 from being accessed by another user without permission, while also permitting users with different levels of access to collaborate on a component design 114.

For example, users provided with the CAx environments 112a, 112b (shown in FIGS. 2A and 2B) may have different levels of access or permissions corresponding to the component design 114 such that the user of the CAx environment 112a desires to store data corresponding to the features 116d and 116e (shown in FIG. 2A) at a different memory location with a restricted level of access, such as a different database partition 117 or data container 119. In this manner, the user provided with CAx environment 112b is able to collaborate on the component design 114 but is unable to access the location of the data corresponding to the features 116d and 116e, for example.

In some embodiments, the CAx package 140 is provided as a portion of a CAx software tool integrated into or with a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to store data corresponding to the component design 114 to different locations depending on any of the one or more predetermined criterion discussed in this disclosure. Each of these modules includes executable software instructions and/or digital or analog hardware circuitry.

In some situations, the multiple users or entities provided with a CAx environment 112 are assigned with different level(s) of access to the component design 114 via one or more profiles 142 which can be organized by one or more groups. Each profile 144 corresponds to a physical user, such as a user operating one of the client computers 104, a user account, an instance of a CAx environment 112, or a computing device configured to execute a CAx tool or CAx environment 112, for example. In some embodiments, different levels of access are designated for users that are restricted from access due to export controls, security classification or proprietary restrictions, for example. Other restricted and unrestricted levels of access are contemplated in this disclosure, including job disciplines, and organization structures or entities, for example. Accordingly, it may be desirable to limit the access, display and/or ability to modify a particular aspect of a component design 114 depending on the level(s) of access corresponding to a particular profile 142. Various aspects of a component design 114 can likewise be assigned to or designated by any of these levels of access or permissions, for example, depending on the needs of a particular situation.

In some examples, each profile 142 corresponds to one or more access lists 144 setting or otherwise designating one or more levels of access for each profile 142 or group of profiles, or at least some profiles 142 and/or group of profiles. The component design 114, or various aspects of the component design 114 including the feature(s) 116 or feature type(s), can be associated with one or more of the level(s) of access, for example. In yet other examples, access rights or permissions are set or otherwise designated for each database entry corresponding to an assembly, component design 114, feature 116 and/or feature type, for example, which in some examples corresponds to a field of a particular database record or entry, in addition to or apart from the various storage techniques discussed in this disclosure.

The CAx package 140 includes a data module 146 configured to access, retrieve and/or store data corresponding to a component design 114. In some embodiments, the data is stored in one or more databases 109 or database partitions 117 as one or more tables, records or entries. In other embodiments, the data is stored in one or more part files 113 and is accessible by referencing one or more objects or memory locations references by the one or more records or entries. In one embodiment, each part file 113 or record includes data corresponding to at least one feature 116, such as any of the feature types discussed in this disclosure. In other embodiments, each database 109 organizes the data in one or more tables that include a list of part files 113 linked to a list of features 116 corresponding to a component design 114 and/or part file 113, and a list of feature types corresponding to the features 116, for example.

In some embodiments, the part files 113 are stored in one or more data folders or containers 119 provided by a file system. In an embodiment, the databases 109, database partitions 117, part files 113, and/or data containers 119 reside on the same data storage device, such as the storage system 108, and in another embodiment, at least some or all of the databases 109, database partitions 117, part files 113, and/or data containers 119 reside on different data storage devices. Each of these techniques facilitates the implementation of access control or protection of data corresponding to various aspects of a component design 114.

In some embodiments, the CAx package 140 includes a display module 148. The display module 148 is configured to display data corresponding to a component design 114 in a CAx environment 112, such as in one of the CAx environments 112*a*, 112*b*. In one embodiment, the data module 146 is configured to create a local copy 114' of the component design 114, which is updated or synchronized in real-time or periodically as modifications to the component design 114 occur, and in some embodiments is displayed in response to modification of the component design 114. In another example, the display module 148 is configured to display data corresponding to the local copy 114' of the component design 114. In some embodiments, data corresponding to one or more features 116 of the component design 114 is stored remotely from a computing platform storing the local copy 114', such that various access control techniques can be utilized.

In some embodiments, the data module 146 interfaces or otherwise communicates with a synchronization module 150 to provide the desired solution. The synchronization module 150 is configured to control or otherwise coordinate access to each database 109, database partition 117, component design 114, feature 116 or feature type, part file 113, and/or data container 119, for example. In some embodiments, the synchronization module 150 is configured to link or otherwise associate each database 109, database partition 117, data container 119 and/or part file 113 to the component design 114 and/or to each other.

In one embodiment, the data module 146 provides the functions of the synchronization module 150. In some embodiment, the host computer 102 provides the synchronization module 150 as one or more software services. In another embodiment, each of the client computers 104 is operable to execute an instance of a synchronization module 150. In one embodiment, a single computing platform such as the host computer 102 or one of the client computers 104 is configured to execute the data module 146 and the synchronization module 150.

In one embodiment, the synchronization module 150 executes various system and/or application commands or instructions to provide the desired solution, which may be provided by an application program interface (API) associated with a database management system (DBMS) such as a relational database management system (RDBMS), for example. However, other techniques are contemplated, including storing the data as binary data in one or more tables, as objects that store the binary data in a file system, or a combination of a database and file system technology.

In one embodiment, the database 109 is configured to store metadata corresponding to the component design 114, and each data container 119 is configured to store binary data corresponding to the component design 114, with the metadata linked to or otherwise associated with a location of the binary data. In another embodiment, one or more checkpoints are selectively applied to the metadata such that upon query of the database 109, only data corresponding to modifications to the component design 114 are communicated between one of the data containers 119 and the data module 146, thereby reducing data transfer requirements and improving system resource utilization.

The CAx package 140 includes a comparison module 152 configured to cause another module such as the data module 146 to store data corresponding to the component design 114 to a particular location in one or more of the databases 109, database partitions 117, data containers 119, and/or part files 113, for example, based on at least one predetermined criterion. The at least one predetermined criterion can be set or otherwise designated by a user provided with the functionality of the CAx package 140, either manually during execution of a CAx environment 112, such as by one or more graphical user interfaces (GUI), or at system configuration or run-time, for example.

In one embodiment, the comparison module 152 is configured to cause the data module 146 to store data corresponding to the component design 114 at a first location such as database 109A, database partition 117A, part file 113A and/or data container 119A when at least one predetermined criterion is met, and is configured to cause the data module 146 to store the data at a second location such as database 109B, database partition 117B, part file 113B and/or data container 119B when the at least one predetermined criterion is not met. Other arrangements for controlling access to the various aspects of the component design 114 are contemplated. In some embodiments, the first database 109A or database partition 117A corresponds to the first part file 113A, and the second database 109B or database partition 117B corresponds to the second part file 113B.

In one embodiment, the comparison module 152 is configured to cause the data module 146 to store data corresponding to unrestricted aspects of the component design 114 to the first location, and restricted aspects of the component design 114 to the second location. In another embodiment, the comparison module 152 is configured to cause the data module 146 to store data corresponding to unrestricted aspects of the component design 114 to the second location as well. In some examples, the display module 148 is configured to display data corresponding the component design from the first location when the at least one predetermined criterion is met, but display the data corresponding the component design from the second location when the at least one predetermined criterion is not met. This technique may reduce the number of queries and/or data transmissions for users having or not having access to the restricted aspects of the component design.

Although two databases 109, database partitions 117, data containers 119 and/or part files 113 are discussed herein, it should be appreciated that any quantity of databases 109, database partitions 117, data containers 119 and/or part files 113 are contemplated with the teachings of this disclosure. In one example, each of the databases 109A and 109B is a child database each corresponding to a parent database 109P, which may correspond to an assembly or group of parts or components, for example. In other examples the data can be stored directly in one or more part files 113 apart from the utilization of a database solution.

Various criteria are contemplated in this disclosure. In some embodiment, the at least one predetermined criterion relates to a profile 142 such as the user profile or any other profile discussed herein corresponding to a CAx environment 112. In yet another embodiment, the predetermined criterion is based on the access list(s) 144 corresponding to one or more profiles 142, such as a user profile, or group of user profiles, provided with a CAx environment 112. In some embodiment, the predetermined criterion is at least partially based on at least one of the features 116, group of feature types. In another embodiment, the at least one predetermined criterion is based on one or more virtual or physical memory locations and/or access permissions corresponding to each of the data containers 119.

In one embodiment, the at least one predetermined criterion is met when the profile 142 or the CAx environment 112 relating to the data module 146 has access to the component design 114, or relevant portions of the component design 114 such as particular part files 113, features 116 and/or feature types, each of which may be designated with different levels of access. In another embodiment, the predetermined criterion is based on at least one layer corresponding to at least one feature 116 or featured type.

In some embodiments, the at least one predetermined criterion and at least one of the databases 109, database partitions 117, data containers 119 and/or part files 113 correspond to the at least one access list 144. In one embodiment, the first database 109A, partition 117A, data container 119A, and/or part file 113A corresponds to a first access condition or permission, and the second database 109B, partition 117B, data container 119B, and/or part file 113B corresponds to a second, different access condition or permission. It should be appreciated that various aspects of the component design 114, including corresponding features 116 and data, can be associated with one or more levels of access corresponding to the at least one access list 144 depending on the needs of a particular situation.

For illustrative purposes only, the environment 112b of FIG. 2B may correspond to a first access condition or permission and is able to access, view and/or edit various aspects of the component design 114, including features 116 such as the features 116b, 116c and 116f, for example, but is unable to access, view and/or edit other features 116 such as features 116d, 116e created by the user provided with the first CAx environment 112a and which correspond to a second access condition or permission. This approach permits the users provided with CAx environments 112a, 112b to collaborate on the component design 114, while also having the ability to limit the user provided with second CAx environment 112b to access, view or edit aspects of the component design 114, including the corresponding part file(s) 113 and feature(s) 116.

In other embodiments, the synchronization module 150 is configured to communicate data corresponding to the component design 114 from one of the databases 109, database partitions 117, data containers 119 and/or part files 113 based on the at least one predetermined criterion and in response to querying the database 109. In some embodiments, the synchronization module 150 is configured to access data at a particular location in response to querying the one or more access lists 144 to determine the level(s) of access the requesting CAx environment 112 has to the various aspects of a component design 114. This technique reduces the likelihood of disclosing aspects of a component design 114 and related data or information to restricted users, profiles, systems or entities, for example.

In some embodiments, the at least one predetermined criterion is based on at least one of a part identifier and an assembly identifier, each of which corresponds to a part file 113, component design 114 and/or access list 144. For example, the assembly identifier may correspond to a group of different parts, each part associated with a unique part identifier. In other embodiments, the comparison module 152 evaluates the feature update(s) according to more than one predetermined criterion, such as any of those discussed in this disclosure.

Figure 4:
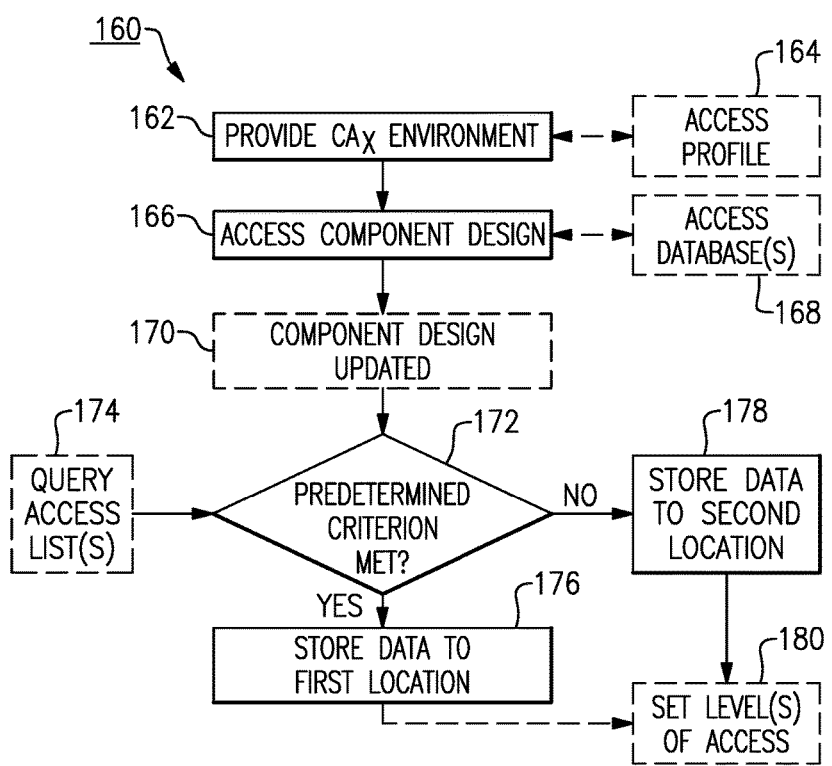
FIG. 4 illustrates a process for storing data corresponding to a component design, according to an embodiment.

FIG. 4 illustrates a storage process or algorithm 160 for storing data corresponding to a component design, utilizing any of the techniques described in this disclosure and the CAx package 140 shown in FIG. 3, according to the process flow of FIG. 4. The storage algorithm 160 is executed within a CAx environment, such as one of the CAx environments 112a, 112b shown in FIGS. 2A-2B. In some embodiment, a profile such as a user profile corresponding to the CAx environment is accessed at block 164.

The storage algorithm 160 accesses a component design to be loaded into the CAx environment at block 166. In some embodiment, the storage algorithm 160 accesses one or more databases, database partitions, data containers and/or part files corresponding to the component design at block 168, and in other embodiment, creates at least one database entry and/or part file corresponding to a component design. In some embodiment, various aspects of the component design are created or updated at block 170, such as the modification or addition of a feature, for example, and in other embodiment, the storage algorithm 160 causes at least one part file corresponding to a component design to be created.

At block 172, the storage algorithm 160 evaluates or otherwise determines whether the new or modified feature(s) of the component design meets the at least one predetermined criterion, including any of the criteria disclosed herein. The at least one predetermined criterion can be set during system configuration, or can be manually selected by a user provided with a CAx environment. In some embodiments, the storage algorithm 160 accesses or queries at least one access list at block 174 to determine if the at least one predetermined criterion is met.

At block 176 the storage algorithm 160 causes at least some of the data corresponding to component design to be stored at a first or restricted location. The first restricted location can be designated utilizing any of the techniques described in this disclosure, including a database, database partition, data container, part file, and/or data storage device, for example. At block 178, the storage algorithm 160 causes the data to be stored to a second or unrestricted location when the at least one predetermined criterion is not met, such as another database, database partition, data container, part file, and/or data storage device, for example, which is separate and distinct from the first or restricted location. The first and second locations can be characterized by any of the techniques described herein, such as different levels of access or access conditions, for example. In some embodiments, various levels of access or permissions of the first and/or second locations are set or otherwise indicated at block 180, including locations or references to any locations of a database, database partition, data container, and/or part file, for example.

The storage algorithm 160 can programmed in the CAx software directly, provided as one or more software plug-ins adapted to work with the native CAx software, or provided in a standalone program to interface with a CAx package to provide the desired solution. While the CAx package 140 and the storage algorithm 160 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running the multi-user CAx environment 112 can be programmed with multiple additional tools, and the various features and tools included can be configured to interoperate with each other according to known principles.

Although the discussed examples illustrate a specific component, examples or embodiments of this disclosure are not limited to those particular combinations. One of skill in the art having the benefit of this disclosure will recognize that it is possible to use some of the components or features from one of the examples in combination with features or components from another one of the examples. Furthermore, various embodiments may include one or more examples within them, while other embodiments may include a different subset of examples. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
    a first multi-user CAx environment including a data module and a comparison module, the data module configured to access at least one database corresponding to a component design, the component design corresponding to a group of feature types;
    wherein the comparison module executes to cause the data module to store data corresponding to the component design in a first data container when at least one predetermined criterion is met in operation, and executes to cause the data module to store the data in a second data container when the at least one predetermined criterion is not met in operation;
    wherein the data characterizes at least one feature of the component design, the at least one feature selected from the group of feature types;
    wherein a first access condition is set for the first data container, a second, different access condition is set for the second data container, the at least one predetermined criterion is at least partially based on at least one of the first and second access conditions, and the first and second access conditions relate to at least one access list; and
    wherein a second multi-user CAx environment is able to access the at least one feature and other features of the component design when the at least one predetermined criterion is met; and
    wherein the second multi-user CAx environment is unable to access the at least one feature when the at least one predetermined criterion is not met, but is able to access the other features when the at least one predetermined criterion is not met.

2. The system as recited in claim 1, wherein the at least one predetermined criterion is at least partially based on at least one of the group of feature types, a part identifier and an assembly identifier each corresponding to the component design.

3. The system as recited in claim 1, wherein the first data container is configured to store a first part file, the second data container is configured to store a second part file, and the at least one database is configured to link the component design to the first and second part files.

4. The system as recited in claim 1, wherein the at least one database is configured to store metadata corresponding to the component design, and the first and second data containers are configured to store binary data characterizing the component design.

5. The system as recited in claim 1, wherein the first data container is located at a first data storage device and the second data container is located at a second data storage device.

6. The system as recited in claim 1, comprising a synchronization module configured to link the first data container and the second data container to the at least one database.

7. The system as recited in claim 6, wherein the synchronization module is configured to communicate data corresponding to the component design from one of the first data container and the second data container based on the at least one predetermined criterion and in response to querying the at least one database.

8. A system for collaborating on a component, comprising:
    a first multi-user CAx environment including a data module and a comparison module, the data module configured to access data corresponding to a component design, the component design corresponding to a group of feature types;
    wherein the comparison module executes to cause the data module to store data corresponding to the component design at a first database partition when at least one predetermined criterion is met in operation, and executes to cause the data module to store the data at a second database partition when the at least one predetermined criterion is not met in operation;
    wherein the comparison module is configured to be executed by a computing platform, the computing platform including a processor and a memory storage device;
    wherein the at least one predetermined criterion is based on at least one access list, and the first and second database partitions are accessible according to the at least one access list;
    wherein the data characterizes at least one feature of the component design, the at least one feature selected from the group of feature types;
    wherein a first access condition is set for the first database partition, a second, different access condition is set for the second database partition, the at least one predetermined criterion is at least partially based on at least one of the first and second access conditions, and the first and second access conditions relate to at least one access list; and
    wherein a second multi-user CAx environment is able to access the at least one feature and other features of the component design when the at least one predetermined criterion is met; and
    wherein the second multi-user CAx environment is unable to access the at least one feature when the at least one predetermined criterion is not met, but is able to access the other features of the component design when the at least one predetermined criterion is not met.

9. The system as recited in claim 8, wherein the first database partition is linked to a first part file, and the second database partition is linked to a second part file.

10. The system as recited in claim 9, wherein the first database partition is a first database linked to a parent database, the second database partition is a second database linked to the parent database, and the data module is configured to access the parent database to store the data corresponding to the component design.

11. A method for collaborating on a component, comprising the steps of:
 executing a data module to access, from a first multi-user CAx environment, at least one database corresponding to a component design, the component design corresponding to a group of feature types;
 executing a comparison module to cause data corresponding to at least one feature of the component design to be stored to a first data container when at least one predetermined criterion is met in response to the first multi-user CAx environment, but causing the data to be stored to a second data container when the at least one predetermined criterion is not met, the at least one feature corresponding to the group of feature types;
 wherein the at least one predetermined criterion and the first and second data containers correspond to at least one access list;
 executing a display module to display the data corresponding to the component design from the first data container in a second multi-user CAx environment when the at least one predetermined criterion is met such that the at least one feature is accessed by the second multi-user CAx environment, but displaying the data corresponding to the component design from the second data container in the second multi-user CAx environment when the at least one predetermined criterion is not met such that the at least one feature is inaccessible to the second multi-user CAx environment but other features of the component design are accessed by the second multi-user CAx environment, the second multi-user CAx environment and the at least one predetermined criterion corresponding to the at least one access list; and
 wherein features of the component design are simultaneously accessible from the at least one database by the first multi-user CAx environment and the second multi-user CAx environment such that the second multi-user CAx environment is able to collaborate on the features of the component design with the first multi-user CAx environment.

12. The method of claim 11, wherein the step of executing the display module to display is performed in response to modification of the component design by a first user profile characterized by the at least one access list, the first user profile corresponding to the first multi-user CAx environment.

13. The method of claim 11, comprising:
 linking a field in the at least one database to a first part file at the first data container when the at least one predetermined criterion is met, but linking the field to a second part file at the second data container when the at least one predetermined criterion is not met, the field corresponding to the component design.

14. The system as recited in claim 7, wherein the first data container is configured to store a first part file, the second data container is configured to store a second part file, and the at least one database is configured to link the component design to the first and second part files.

15. The system as recited in claim 14, wherein the at least one predetermined criterion is at least partially based on at least one of the group of feature types, a part identifier and an assembly identifier each corresponding to the component design.

16. The system as recited in claim 15, wherein the at least one feature and the other features are designated by the first multi-user CAx environment to a plurality of layers, and the at least one predetermined criterion is based on a respective layer of the plurality of layers that corresponds to the at least one feature.

17. The system as recited in claim 10, wherein the at least one predetermined criterion is at least partially based on at least one of the group of feature types, a part identifier and an assembly identifier each corresponding to the component design.

18. The method as recited in claim 13, wherein the at least one predetermined criterion is at least partially based on at least one of the group of feature types, a part identifier and an assembly identifier each corresponding to the component design.

* * * * *